Patented July 24, 1934

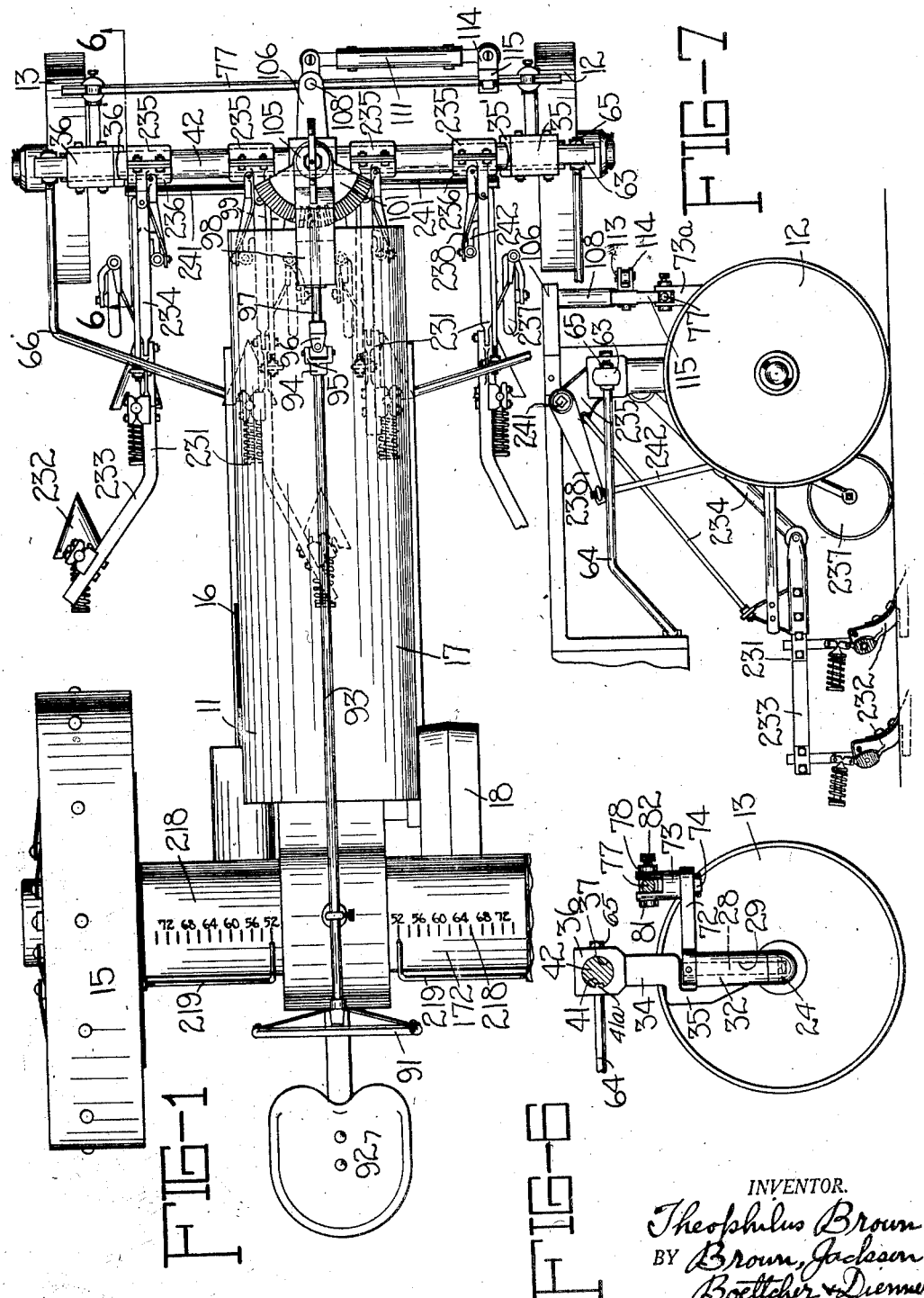

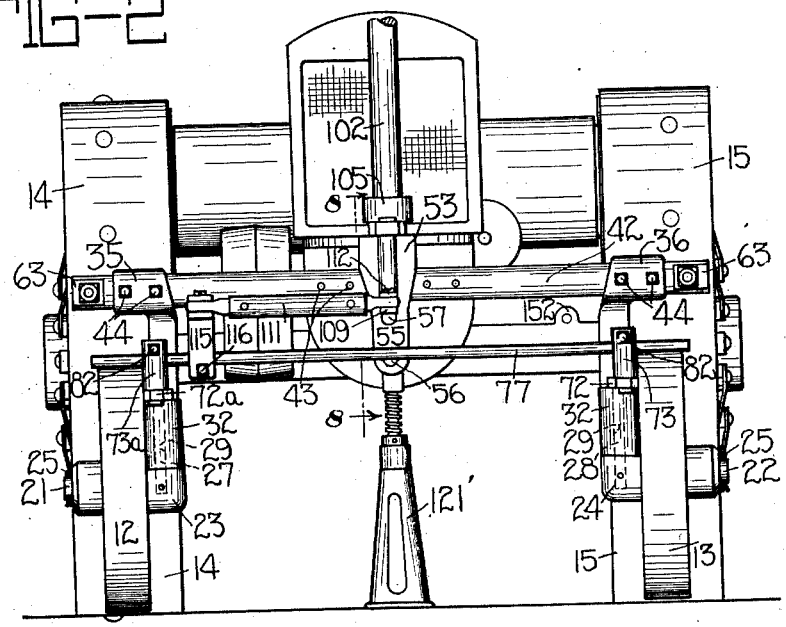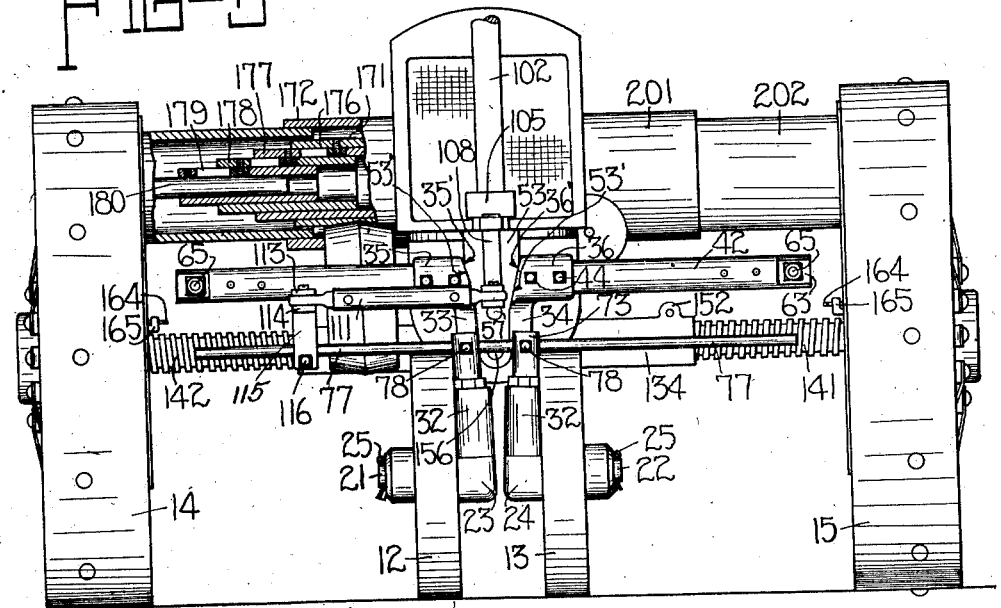

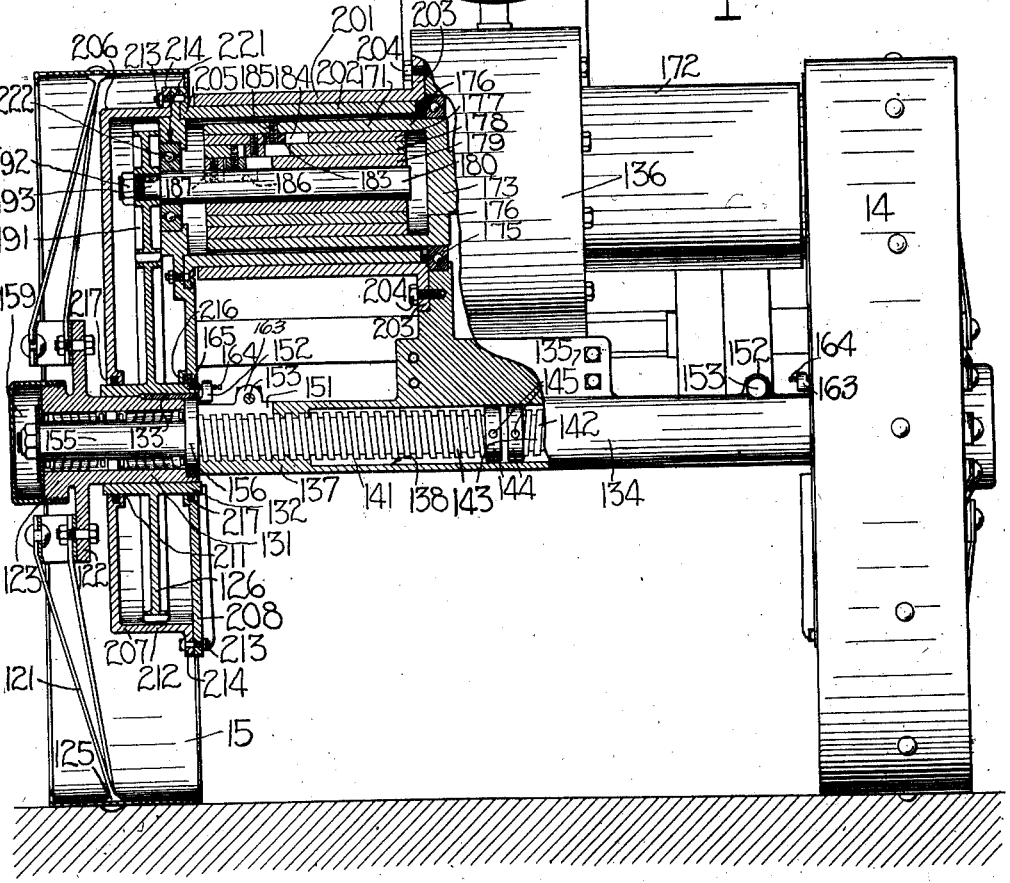

1,967,283

UNITED STATES PATENT OFFICE 1,967,283

ADJUSTABLE TRACTOR WHEEL

Theophilus Brown, Moline, Ill., assignor to Deere & Company, Moline, Ill., a corporation of Illinois Application July 9, 1931, Serial No. 549,591

3 Claims. (Cl. 180—1)

My invention relates to tractors, and has to do more particularly with an improvement in tractors whereby the supporting wheels may be adjusted to vary the tread of the implement.

It is often desirable to change the tread of tractor wheels employed when cultivating certain types of crops, or to vary the tread of a tractor employed to meet different conditions in a particular kind of crop. It is likewise advantageous to widen the tractor's tread to enable it to bridge two or more rows of the crop, especially when a two-row cultivating attachment or other like implement is being propelled by the tractor. A tractor having supporting wheels which can be varied to widen its tread has great utility in many other situations as for instance, in grading or in ditch forming, where it is often advantageous that the tractor wheels, particularly the driving wheels, straddle the ditch or certain parts of the road.

It is broadly the purpose of this invention to provide a tractor with supporting wheels which are capable of being adjusted laterally to meet different operating requirements.

The main object of the present invention is the production of a tractor which can be changed from a conventional four-wheel narrow tread type of tractor to a three-wheel wide tread type of tractor. That is, the rear traction wheels of the tractor may be spread apart to span two rows of a crop and the front wheels may be brought in close together so as to travel between the two rows straddled by the rear wheels of the tractor.

It is a further object of the present invention to provide a tractor with front supporting wheels, which may be manually adjusted from a wide tread to a narrow tread, or vice versa, the narrow tread having the effect of a single front wheel.

A still further object of the present invention is the provision of steering mechanism which will control the front wheels when adjusted to either wide or narrow positions, or any intermediately adjusted position.

Another object of the invention is to provide an adjustable tread front wheel arrangement wherein the front wheel axle can be arranged for free rocking movement with respect to the tractor frame when the front wheels have one tread spacing and wherein this front axle can be locked against said rocking movement when the wheels have a different tread spacing.

Other objects and advantages of this invention will be apparent to those skilled in the art from the following description, taken in conjunction with the accompanying drawings, in which:

Figure 1 is a fragmentary plan view of a tractor embodying my invention showing both pairs of wheels adjusted to substantially the same comparatively narrow tread width corresponding to a conventional four-wheeled tractor;

Figure 2 is a fragmentary front elevational view of the tractor as seen in Figure 1, showing in detail the mounting of the front wheels;

Figure 3 is a fragmentary front elevational view of the tractor, partly in section, showing the rear supporting wheels adjusted to provide a wide tread, while its front wheels are adjusted or brought together to provide a relatively narrow tread, thus producing in effect a wide tread, three-wheel tractor;

Figure 4 is an enlarged rear elevational view, partly in section, showing the details of the mechanism for adjusting the tread at the rear wheels and for driving the same;

Figure 5 illustrates a fragmentary portion of the rear axle housing, showing in dotted lines the independent axles;

Figure 6 is a sectional view taken along the line 6—6 of Figure 1, showing some of the details of the front wheel supporting and steering mechanism;

Figure 7 is a fragmentary side elevational view of one of the front supporting wheels, illustrating the attachment of a cultivator rig assembly;

Figure 8 is a sectional view of the front axle supporting structure taken approximately on line 8—8 of Figure 2; and Figure 9 is an enlarged fragmentary view of certain of the parts shown in Figure 4 illustrating the means for securing the wheel axle to the wheel driving gear.

The present embodiment of my invention is shown as applied to the usual type of farm tractor, indicated generally at 11, having front steering wheels 12 and 13, and rear driving wheels 14 and 15 for supporting a conventional frame structure 16. The usual fuel supply tank 17 is shown as being mounted longitudinally above the engine (not shown). A conventional belt pulley 18 is shown located on the right side of the implement as viewed in Figure 1. It is understood that my invention may be embodied in any type or design of tractor and the conventional motor, frame structure, etc., may take any desired form within the teachings of my invention.

Referring particularly to Figures 2, 3 and 6, the front wheels 12 and 13 are mounted on stub axles 21 and 22 extending laterally from blocks 23 and 24. Any suitable retaining means indicated at 25 rotatably secure the wheels on the stub axles 21 and 22. The axles 21—22 may be set at an angle to the vertical to give an appropriate camber to the front wheels. The blocks 23 and 24 have vertically extending spindles 27 and 28 which are journaled in vertical bores 29 in the sleeve members 32. The sleeve members 32 are lower members of the vertical supporting brackets 33 and 34. As best seen in Figure 6, each supporting bracket 33, 34 has an offset intermediate portion 35 on the rear side thereof for a purpose to be hereinafter described. At their upper ends the brackets 33 and 34 have horizontally extending sleeve members 35 and 36, the central bores 37 of which are received on laterally extending shaft or axle 42. The sleeves 35 and 36 are prevented from rotating on the axle 42 by means of a suitable keyway 41 extending substantially the entire length of the rear side of axle member 42, and by suitable keys 41a fitted into the bore 37 of each sleeve and received for longitudinally sliding movement in the keyway 41. Thus the sleeves 35 and 36 of the depending bracket structures 33 and 34, respectively, have sliding movement along the axle 42 but at the same time are prevented from rotating thereon.

Transverse openings 43 are provided at spaced intervals along the axle 42 and the sleeves 35 and 36 are held in any adjusted position by bolts 44 which extend through the sleeves and through these openings 43. In Figures 1 and 2, the front supporting wheels 12 and 13 are spaced apart their maximum extent, thus providing a conventional four-wheel standard tread type of tractor, the front wheels being of substantially the same tread as the rear wheels 14 and 15. Figure 3 shows the front wheels 12 and 13 in their other extreme positions. That is, the sleeves 35 and 36 of the brackets 33 and 34 have been moved together on the transverse axle 42 until they abut a depending bracket 53 rigidly connected with the tractor.

The axle 42 is supported on the front of the tractor in a manner now to be described. Referring more particularly to Figures 2 and 8, an arm 51 is welded or otherwise secured to and extends downwardly from the central portion of the axle 42 and the lower end of this arm 51 is pivoted as at 52, to the depending bracket 53. The depending bracket 53 has a transverse slot 54 for receiving the axle 42 and the depending arm 51. A pair of legs 55 are formed by the slot 54 and these legs 55 embrace or straddle both the axle and the downwardly extending arm 51. A pivot pin or bolt 56 extends through alined openings in the lower ends of the legs 55 and the arm 51, thus allowing the axle 42 to rock vertically on the bolt 56, the latter establishing a pivot center considerably below the axle. An additional set of alined openings 57 are formed in the legs 55 and arm 51 below the axle 42 and these openings 57 are adapted to receive a bolt or pin (not shown) to lock the axle 42 against rocking. The locking pin is preferably inserted in the alined openings 57 when the brackets 33—34 and wheels 12—13 are brought together as viewed in Figure 3 to provide a rigid front axle 42 at this time. It is to be noted, moreover, that when the brackets 33 and 34 abut against the depending bracket 53, as aforesaid, and are held in that position by the bolts 44 as shown in Figure 3, the axle 42 is prevented from swinging about the pivot pin 56, even though a locking pin is not inserted in the holes 57. In this manner, the front wheels 12 and 13, in effect, operate as a single front supporting and steering wheel. The upper end 61 of the depending bracket 53 is fixed to the tractor frame 62 in any preferred manner.

The opposite ends of the axle 42 have flattened portions 63 through which portions the forward ends of the radius rods 64 are bolted at 65. These radius rods 64 extend rearwardly of the tractor and are bent diagonally inwardly at 66 and connected at a suitable point (not shown) beneath the crank case or frame of the tractor.

As before mentioned, the front wheels 12 and 13 perform the steering function while still being capable of lateral adjustment. The construction employed for positively steering the wheels 12 and 13 in any of their laterally adjusted positions will now be described. The upper ends of the vertical spindles 27, 28 extend above the tops of the sleeves 32 in which they are journaled. As best seen in Figure 6 the extended end of the spindle 28 has a forwardly extending arm or crank 72 keyed or bolted thereon. The mounting of the crank on each spindle is accommodated by virtue of the offset portion 35 of the vertical bracket 34, the crank being adapted to effect turning or steering movement of its associated front wheel 13. A clevis or pivot block 73 is carried on the forward end of the crank 72 and this block has a downwardly extending stem 74 which is journaled in the crank 72. The upper end of said block 73 is slotted to receive a transversely extending tie rod 77. The tie rod 77 is adjustably secured in the slotted portion of the pivot block by a suitable clamping member 78. The clamping member 78 is shown as comprising a bushing 81 which extends through the block 73 and a set screw 82 threaded in the bushing 81 and against the tie rod 77 to prevent the tie rod from moving laterally in the slotted portion of the block 73. The tie rod 77 is of sufficient length to extend transversely across almost the entire width of the tractor as seen in Figures 1 to 3. The opposite end of the tie rod 77 is supported in a clevis or block 73a mounted on the forwardly extending crank arm 72a, which crank arm is bolted to the vertical spindle 27. The block 73a, crank arm 72a and related structure is identical to that just described for controlling the wheel 13. This tie rod 77 therefore controls steering movement of both front supporting wheels 12 and 13. The tie rod 77 is actuated laterally by the manually operated steering wheel 91 which is mounted adjacent to the operator's seat 92 at the rear of the tractor. The steering wheel 91 is mounted on a conventional steering column or shaft 93 which carries one member 94 of a universal joint 95, the other member 96 being fixed on a short shaft 97 journaled in a suitable bracket 98. The forward end of the rod 97 carries a bevel gear 99 which meshes with a semi-circular rack 101 mounted on the upper end of a spindle 102. The spindle 102 extends vertically of the front of the tractor as viewed in Figures 2 and 3 and this spindle is rotatably held in suitable brackets 105. A forwardly extending crank arm 106 is keyed on the lower end of the spindle 102 for rotating therewith. The forward end of the crank 106 has a downwardly extending rod 108 rigidly secured thereto. The downwardly extending rod 108 pivotally supports a horizontal clevis 109 which extends forwardly therefrom. A drag link 111 is pivotally connected at 112 to the bifurcated end of the clevis 109 and the other end of this link 111 is pivoted at 113 in a similarly bifurcated clevis 114 which is also pivotally mounted in the upper end of a bracket 115 affixed to the transverse tie rod 77. As seen in Figure 3, the bracket 115 comprises a vertically extending bar removably secured on the tie rod 77 by suitable means such as by a bolt 116. If desired, the drag link 111 may be made adjustable in length. To steer the front wheels 12, 13, manual operation of the steering wheel 19 is transmitted to the spindle 102 to, in turn, actuate the connecting link 111 and tie rod 77. The tie rod 77 will actuate the cranks 72a, 72 and spindles 27, 28 to steer both wheels 12, 13 simultaneously.

When it is desired to adjust the front wheels 12 and 13 to change their respective positions on the axle 42 as for instance in changing the wheels from the position shown in Figure 2 to that shown in Figure 3, a jack 121' is employed for raising the front end of the tractor. The jack 121' may, if desired, be carried on the tractor as a part thereof. After the front end of the tractor is raised sufficiently so that the front wheels clear the ground, the bolts 44 are withdrawn from the sleeve members 35 and 36 and the set screws 82 are loosened in the blocks 73 and 73a. The steering connection is disconnected by removing the bolt 116 from the bracket 115, the latter is then removed from the transverse tie rod 77 which will allow the blocks 73 and 73a to be moved along the bar or rod 77. The brackets 33 and 34 are now moved inwardly on the axle 42 and the blocks 73 and 73a are moved therewith along the tie rod 77, to the position as shown in Figure 3. With the front wheels 12 and 13 in this position, there is no necessity for permitting the axle 42 to pivot at 52 on the bolt 56. To prevent such pivoting movement a pin or bolt is inserted in the upper alined openings 57 which now locks the arm 51 rigidly between the legs 55. To increase the rigidity of this lock, the inner ends 35' and 36' of the sleeves 35 and 36, respectively, are beveled to form a wedging fit with the adjacent beveled sides 53' of the bracket 53. The bolts 44 are reinserted again to securely hold the sleeves 35 and 36 tightly against the bracket 53. The steering connection is now reconnected to the tie rod 77 by bolting the member 115 thereon, and reclamping the pivoting blocks 73 and 73a on the tie rod 77. The jack 121' is now removed from beneath the tractor and the latter may then be operated similarly to a conventional single front wheel vehicle.

Referring more particularly to Figure 4, the mechanism whereby the rear driving wheels 14 and 15 may be adjusted laterally will now be described. The mechanisms for adjusting both rear wheels 14 and 15 are independent units and substantial duplicates, and hence only the construction for adjusting one of the wheels need be described. Taking the wheel 15 as an example, this wheel has spokes 121 radiating from a flanged peripheral ring 122 of a hub 123. The outer ends of the spokes 121 are secured to the wheel rim 124 at 125.

For driving the wheel 15, I provide a large gear 126 mounted on the inside of the rim of the wheel in the following manner. The hub 123 has an extended mounting portion 131 for receiving the snugly fitting sleeve hub 132 of the large gear 126. A key 133 mounted in a suitable keyway prevents the large gear 126 from turning relatively to the hub portion 131 of the wheel.

A transversely extending axle supporting housing 134 is fixed to the lower portion 135 of the differential housing 136. The ends of the axle housing 134 each have an internally threaded portion 137, and the central intermediate portion of the housing has an enlarged bore 138. Two axles 141 and 142 are received in the axle housing 134 and each of these axles is externally threaded over the greatest part of its length as shown at 143. The adjacent ends of the axles 141 and 142 are provided with rings or collars 144 held in place by suitable pins 145 passing through the axles. The collars 144 are assembled on the ends of the axles after they have been positioned in the housing 134. An oblong opening 146 (Figure 5) is provided centrally in the housing 134, and the collars 144 are assembled through this oblong opening and secured on the ends of the axles 141 and 142. A cover plate 147 is then bolted over the opening 146 to prevent the entrance of grit or foreign matter. The axle 141 is threaded through the portion 137 of the casing to move the axle longitudinally into and out of the housing. The axles are prevented from being completely removed from the housing by reason of the collars 144 abutting the outer ends of the enlarged bore 138. Said collars in their contact with the side walls of the bore 138 also afford points of bearing support for carrying radial loads at the inner ends of the axles 141 and 142.

The ends of the axle housing 134 each have a radial slot or split 151 which extends a substantial length of the threaded portion 137. A pair of lugs 152 are formed integrally on the housing 134, one such lug extending upwardly from either side of the split 151. A bolt 153 passes through aligned openings in the lugs 152, and upon tightening of the bolt 153, the lugs 152 are drawn together to clamp the axle 141 in the threaded portion 137. Thus, by loosening the bolt 153, the axle may be freely screwed into or out of the axle housing, and, conversely, by tightening the bolt 153 the axle will be locked in the threaded portion 137 against any further turning movement.

The drive wheel 15 is journaled on the extended end 155 of the axle 141, and a peripheral flange or collar 156 is formed on the axle between the threaded portion 143 and the extended end 155. This flange or collar 156 abuts against the end of the housing 134 to limit the inward movement of the axle in the housing.

The drive wheel 15 is held in place on the extended end of the axle and against the collar 156 by any suitable nut and washers. A suitable hub cap 159 is threaded on the hub 123 and covers the end of the axle. Roller bearings are preferably mounted on the end 155 of the axle and within the hub 123 of the wheel. When the tractor 11 is operated under normal conditions the wheel 15 rotates on the axle extension 155, but when it is desired to widen the tread of the wheels, the axle 141 may be locked relative to the wheel 15 so that motion of the wheel will screw the axle longitudinally in the threaded portion 137 of the housing. To lock the axle in the wheel 15, I provide an outwardly projecting arm or lug 163 as an extension from the collar 156. A cap screw 164 is threaded through an opening in the lug 163 to engage in any one of a series of bores 165 formed around the inner side of the hub 132 of the large gear 126 (see Figure 9). When the clamped engagement of the axle is released by releasing the bolt 153, to allow the axle to rotate freely in the housing 134, engagement of the cap screw 164 in one of the bores 165 of the large gear will cause the axle 141 to turn with the wheel. Thus, it is manifest that by now driving the tractor either forwardly or backwardly either of the driven wheels 14 and 15 may be adjusted inwardly or outwardly to change the position of each wheel relative to the frame.

As already mentioned, the rear wheels 14 and 15 propel the tractor, and in order to transmit power to these wheels irrespective of the positions which they may occupy laterally in relation to the frame, a novel driving connection is employed which will automatically adapt itself to any lateral displacement of the wheels to thereby constantly transmit driving power to both wheels. This driving connection preferably consists of two independent driving units, one such unit being mounted at either side of the tractor. Each of these units comprises a laterally extensible and contractable connection maintained in positive driving relationship with each of the rear wheels 14, 15 and in the event that one or both of the rear wheels 14, 15 are adjustably displaced laterally of the frame, the driving connection is simultaneously adjusted to transmit driving torque to the wheels.

The preferred embodiment of such adjustable driving connection comprises a telescopic drive shaft, indicated in its entirety at 171, which is mounted in the casing 172. The shaft 171 includes a member 173 mounted in the differential housing 136 and connected to the engine of the tractor by any suitable gearing means (not shown). The member 173 is mounted in ball bearing race 175, and this member has an enlarged bore or sleeve 176 in which are mounted a series of short telescopic sections 177, 178 and 179. The intermediate sections 177, 178 and 179 are a series of sleeves, all preferably of approximately the same length, each succeeding section or sleeve being of such diameter as to have a snug sliding fit within its neighbor. A central section 180 is shown in the form of a shaft of somewhat greater length than the intermediate sections 177—178—179. Although I have only shown three such intermediate sections 177—178—179, any number of these sections may be employed. The entire series of sections 176—180 of the telescopic shaft 171 are preferably round or cylindrical in form as herein disclosed but either all or some of these sections may be square, octagonal or comprise other shapes so long as they are adjustable to constantly communicate driving power to the wheels 14 and 15.

The intermediate section 177 is keyed to the outer section 176 by the key 183 which fits in a slot or keyway 184 in the section 177; when the sections 176 and 177 are moved relative to one another the key and slot have relative sliding movement. The key 183 is fixed to the inner side of the section 176 by a stud bolt 185. The intermediate sections 177, 178 and 179 are likewise provided with similar key and slot connections so that the sections may slide longitudinally of each other and still maintain a driving relation. The distance each moves is governed by the length of its keyway or slot 184. The shaft 180 is also provided with a keyway 186 for receiving the key 187 of section 179.

A pinion gear 191 is secured on the reduced end 193 of the central shaft 180 by a nut 192. This pinion 191 is in constant mesh with the larger gear 126 fixed on the hub of wheel 15. In this way driving torque is transmitted through the telescopic shaft 171 to the pinion gear 191 from the motive source, the pinion gear 191 in turn driving the large gear 126 and hence the wheel 15.

As best seen in Figures 3 and 4, the casing 172 consists of two telescopic sections or sleeves 201 and 202, the inner section 202 being of such outside diameter as to have a close sliding fit within the outer sleeve 201. This outer sleeve 201 has a flanged end 203 which is secured by suitable bolts 204 to the differential housing 136. The inner telescopic section or sleeve 202 has a peripheral flange 205 on its outer end, and this flange 205 is bolted to a gear casing 206. The gear casing 206 comprises two members 207 and 208 mounted on either side of the gears 126 and 191. The outside member 207 of the casing extends into the wheel 15 and has a cylindrical opening 211 through which the hub 132 of the large gear 126 extends. This outside member 207 has a flanged edge 212 which extends over and around the outer margins of the gears 126 and 191. The inside member 208 comprises a plate on the opposite or inside of the gears 126 and 191 and this plate matches the general contour of the outside member 207 and is bolted around its outer margin, as at 213, to a radially flanged edge 214 of the other casing member 207.

The plate 208 also has a central opening 216 which is mounted on the inner end of the hub 132 of the large gear wheel. Packings 217 are held in suitable channels on the inner peripheries of the openings 211 and 216 in the members 207 and 208. This construction mounts the casing 206 substantially within the confines of the wheel 15, where the casing is partially supported on the hub 132 of the large gear 126. The casing 206 is further braced by being bolted to the inside telescopic sleeve member 202. The inside plate 208 has an offset bearing surface 221 in which is mounted a ball bearing 222, the latter being received on the shaft 180. The sleeves 201, 202 of the housing 172 not only serve to enclose the drive shaft sections and shield them against foreign matter, but these sleeves also serve to hold the telescopic driving shaft 171 against bending stresses resulting from the transmission of driving torque to the rear wheels.

When it is desired to change the width of the tread of the rear wheels 14 and 15, the bolt 153 is loosened at either end of the axle housing 134 to thereby release the clamping effect of the threaded portion 137 of the housing on the axle 141. The cap screws 164 are then screwed into one of the small bores 165 provided in the gear hub 132. This screw 164 then holds the axle 141 in locked relation to the associated gear 126 and wheel 14 or 15. Driving the tractor in one direction will then screw the axle 141 out of the housing 134, and at the same time cause the telescopic drive shaft 171 to expand accordingly.

Reversing the direction of drive of the tractor will conversely thread the axle 141 back into the housing 134. When either one or both of the wheels 14 and 15 have assumed their proper laterally adjusted positions, the cap screws are withdrawn from the bores 165 and the bolts 153 are again tightened in the lugs 152 to clamp the split portions 151 of the housing 134 on the threaded axles 141 and 142 to prevent further turning of the axles relative to the housing.

To prevent the axles 141—142 from being turned too far out of the housing 134, and at the same time to indicate the tread spacing of each wheel 14—15 relative to the center line of the tractor, an indicator is provided as shown in Figure 1, which comprises suitable graduations 218 on each casing 172 and a pointer 219 which is carried by each gear casing 206. The amount of lateral displacement of either of the wheels 14—15 will be readily shown by this indicating device. Should the operator inadvertently fail to stop the tractor when the axle or axles have been screwed longitudinally their maximum extent in either direction, continued movement of the tractor will merely shear off the cap screw or screws 164 to thereafter permit the drive wheels to turn on their axles.

The rear wheels 14 and 15 may be raised or jacked up from the ground and then adjusted together or separately, or as before mentioned they may be adjusted by driving forwardly or rearwardly on the ground. These rear wheels may each be set out at different distances from the center line of the tractor by merely driving it in a circle of the proper radius.

It will thus be seen that I have provided a tractor wherein the wheels may assume the tread width of a conventional four wheeled standard type narrow tread implement, as shown in Figures 1 and 2, or may assume the tread relation of a three wheel wide tread tractor, as shown in Figure 3. In the latter relation, the front wheels are brought together to, in effect, act as a single front supporting and steering wheel, while the rear wheels are spread apart to widen the tread thereof.

When the tread of the tractor is adjusted as viewed in Figure 3, it is then adapted to span two rows of a crop, such as for cultivating corn or the like. In working such a crop, cultivator attachments 231, such as are illustrated in Figures 1 and 7, may be mounted on the front axle 42 of the tractor. The cultivator attachment here shown comprises two sets of cultivator rigs each having the usual shovels 232 suitably mounted on a supporting bar 233. The supporting bar 233 is connected by suitable links 234 to a bracket 235. The bracket, in turn, comprises one half of a split sleeve 236, the two halves of which are clamped to the transverse bar or axle 42. Each rig is also provided with a castor wheel 237 which serves to support the rig 231 in its operative position as well as to gauge the depth of the shovels 232. A crank arm 238 is mounted on a transversely extending rock shaft 241. The rock shaft 241 may be operated by suitable connections (not shown) from a manually actuated device or from a power take-off mechanism on the tractor. The rock shaft 241 is journaled in the brackets 235 and operation of this rock shaft raises or lowers the cultivator rigs through a downwardly extending link 242. In this arrangement, each set of cultivator rigs 231 may be positioned on the axle 42, as shown in Figure 1, to work two rows of the crop and the front wheels may be adjusted to any desired position on the axle 42, such as shown in Figures 1 and 3.

It will be evident from the foregoing that I have provided a tractor for general purposes having a novel and extremely simple mechanism for varying the tread of both the front steering and rear driving wheels without in any way hindering the steering and driving functions which these wheels perform, and have provided a mechanism which can be easily and readily adjusted by the operator without great loss of time or trouble. Notwithstanding the fact that I have shown and described my invention as comprising certain detail structural elements, it is to be understood that numerous changes may be made therein without departing from the spirit and scope of the invention.

What I claim is:

1. In a tractor, a frame, supporting wheels upon which said frame is mounted, certain of said wheels being adapted to steer said tractor, means for adjusting each of said steering wheels laterally of said frame, said means comprising a transversely extending axle, means pivotally connecting said axle to said frame, a bracket disposed between each wheel and the axle, said brackets being movable on said axle between said pivotal means and the end of the axle to move said wheels laterally relative to said frame, said brackets, when moved to their inner position, engaging said pivotal means to lock said axle with respect to the frame, and means for steering said wheels in any of their adjusted positions.

2. An implement having, in combination, a frame, supporting wheels upon which said frame is mounted, certain of said wheels being adapted to steer said tractor, mounting means for said steering wheels for enabling them to be adjusted independently laterally on said implement, said means comprising a transversely extending axle, means for securing said axle against swinging in a horizontal plane, said securing means permitting free rocking movement of the axle in a vertical plane about a longitudinally extending axis, wheel carrying brackets mounted on said axle at opposite sides of said longitudinally extending axis, each bracket being shiftable along said axle to vary the tread between said wheels and each bracket being shiftable into engagement with said securing means to block the axle against said rocking movement, vertically extending pivots on said brackets to which said steering wheels are journaled, and means to positively transmit steering motion to said wheels in any of their laterally adjusted positions.

3. In a tractor, the combination of a frame, supporting wheels upon which said frame is mounted, certain of said wheels being adapted to steer said tractor, a transversely extending axle pivotally secured to said frame, a pair of brackets mounted on said axle one on each side of said pivot, said brackets comprising portions movable longitudinally on said axle and other portions mounting said steering wheels, said axle being adapted to pivot on a horizontal axis when said brackets and wheels are in their laterally adjusted positions on said axle, means to lock said axle against pivoting relative to said frame when said brackets and wheels are adjusted to their innermost lateral positions, whereby said steering wheels will operate, in effect, as a single front steering wheel, and means for positively steering said wheels in any of their laterally adjusted positions.

THEOPHILUS BROWN.